Sept. 29, 1925.
B. S. RAMEY
1,555,518
NUTCRACKER
Filed May 1, 1925
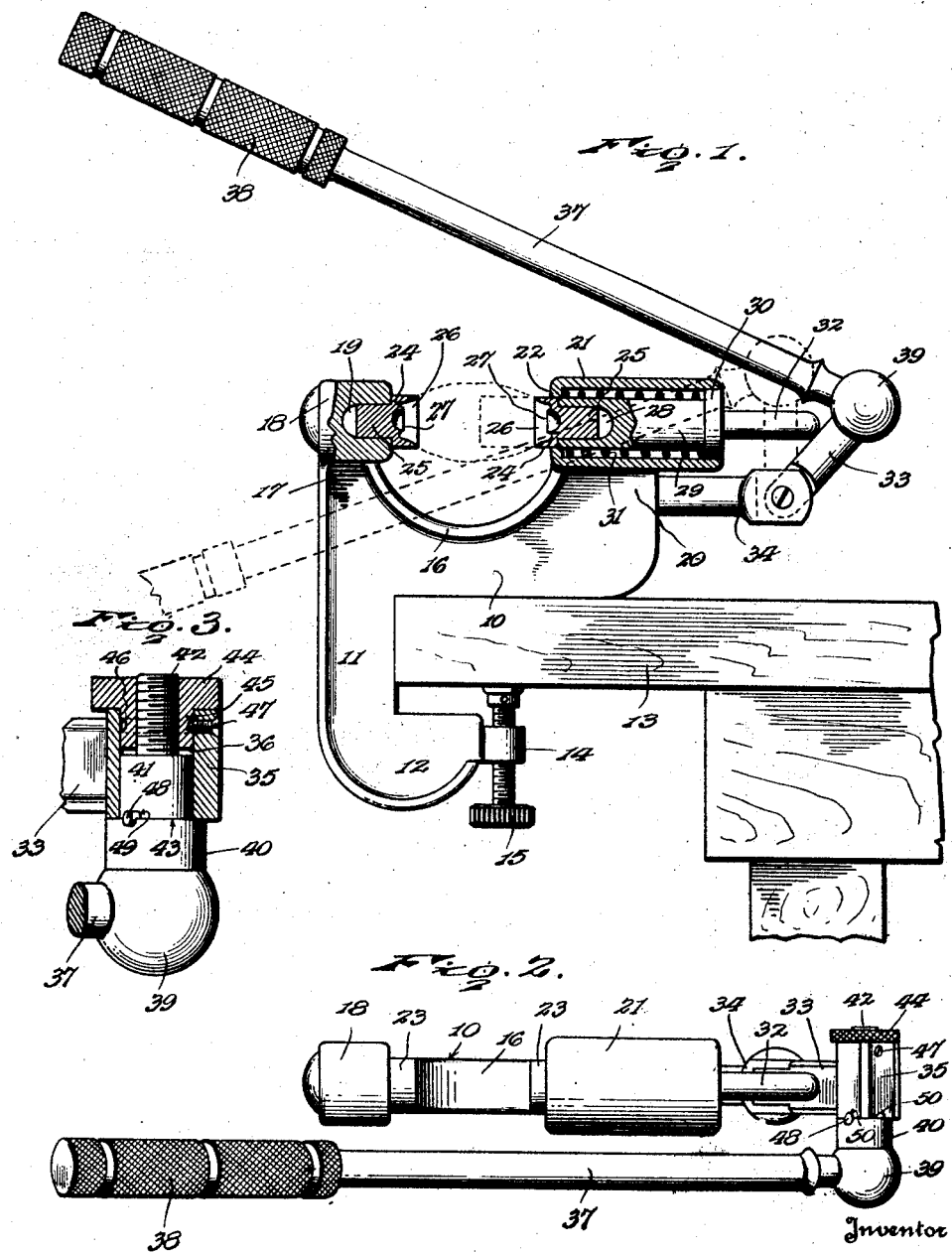
Inventor
B. S. Ramey.

Patented Sept. 29, 1925.

1,555,518

UNITED STATES PATENT OFFICE.

BROOKE S. RAMEY, OF BROWNWOOD, TEXAS.

NUTCRACKER.

Application filed May 1, 1925. Serial No. 27,238.

*To all whom it may concern:*

Be it known that I, BROOKE S. RAMEY, a citizen of the United States, residing at Brownwood, in the county of Brown and State of Texas, have invented certain new and useful Improvements in Nutcrackers, of which the following is a specification.

This invention relates to an improved nut cracker and is particularly intended for cracking pecans and other nuts which are difficult to crack without breaking the meat. This has been found difficult to do as the pecan is so shaped that, when ordinary nut crackers are used, the pressure required to break the shell will cause the meat to be broken and, therefore, the meat is removed from the shell in pieces instead of in two whole sections. Of course, with paper shell pecans they can be easily broken and the meat removed as whole sections but with the hard shell pecan this is difficult to do and, therefore, the meat removed from hard shell pecans cannot be sold for as high a price as that removed from the paper shell pecans. This improved nut cracker is so constructed that, when in use, the end portions of the shell will first be bodily cut away and the body portion of the shell then broken by endwise pressure without the meat being broken.

Another object of this invention is to provide a nut cracker having jaws which can be removed from sockets in which they are mounted and new jaws put in place when necessary.

Another object of the invention is to provide a nut cracker having one of the jaws carried by a plunger which is slidably mounted in an improved manner and engaged by an improved type of lever so that it can be moved forwardly against the action of a spring yieldably resisting forward movement of the plunger.

Another object of the invention is to so construct the plunger-operating means that a lever forming part of the same may be angularly adjusted and caused to extend in a direction which will be most convenient when the nut cracker is in use.

Another object of the invention is to so construct the nut cracker that the hand-engaging lever may be relatively long and thus permit of a leverage being exerted which will cause the pecans to be very easily cracked.

The invention is illustrated in the accompanying drawing, wherein—

Figure 1 is a view showing the nut cracker applied to a table or bench, the nut cracker being shown principally in side elevation and partly in longitudinal section;

Fig. 2 is a top plan view of the nut cracker, and

Fig. 3 is an enlarged fragmentary view of the operating handle, portions of the same being shown in section.

The improved nut cracker is provided with a body portion 10 formed of cast metal and at its outer end is provided with a depending arm or leg 11 from which extends a foot portion 12 to be disposed beneath the bench or table 13 when the nut cracker is put in place with the body portion in engagement with the top of the table. A bearing 14 extends from the foot 12 and carries a clamping screw 15 which, when turned in the proper direction, will be moved upwardly and engage the under face of the table 13. By tightening this screw the proper amount, the body of the nut cracker may be very securely clamped to the table. The body 10 is recessed intermediate its length, as shown at 16, thereby providing end portions which extend upwardly in spaced relation, as shown in Fig. 1. The end portion 17 terminates in a head 18 having a socket 19 leading from its inner end, and the end portion 20 is provided at its upper end with a cylindrical casing 21 disposed longitudinally of the body and at its inner end provided with an inwardly extending annular flange 22. The head 18 and cylindrical casing 21 are in axial alinement with each other.

The nut-engaging jaws 23 are identical in construction and each is provided with a head 24 from which extends a reduced stem or shank 25. The head 24 is provided with a cup-shaped recess or pocket 26 adjacent the bottom of which is provided an annular rib 27. This rib 27 is sharpened so that, when pressure is applied, the ribs of the two jaws will cut through the end portions of the shell of a pecan gripped between the jaws and cause the end portions of the pecan to be cut out circumferentially of the pecan. By having the two jaws identical in size and construction, they will be interchangeable and either one have its shank portion 25 fitted into the socket 19 of the head 18, The shank of the other jaw will be fitted into the socket 28 formed in one end portion of a plunger 29. This plunger 29 is slidably mounted in the casing 21 and for the major portion of its length is of a diameter to permit it to pass through the open inner end of the casing in snug engagement with the annular flange 22. At its rear end the plunger 29 is provided with an enlarged collar 30 which fits snugly in the casing and not only holds the plunger in proper axial alinement with the casing but also serve as abutment means for engaging one end of a spring 31 placed in the casing about the plunger with its other end abutting against the abutment flange 22. A pin 32 extends outwardly from the plunger at the end portion thereof provided with the abutment collar 30 and is disposed for engagement by the operating means.

The operating means includes an arm 33, the lower end portion of which is pivotally connected with the bearing bracket 34 carried by the body 10 and extending from the body portion 10 beneath the cylindrical casing 21. At the upper end of the arm 33 there is provided a head 35 having a bore 36 formed axially therein and transversely of the arm 33. The lever 37 which is of sufficient length to extend forwardly beyond the forward end of the body 10 is provided at its free end with an enlarged and preferably roughened portion forming a hand grip 38. At its rear end the lever terminates in a semi-spherical head 39 provided with a side extension or arm 40 which is reduced intermediate its length to provide a shank 41 of a diameter to fit snugly in the bore 36 of the head 35 and has its free end portion further reduced and threaded to provide a threaded stem 42. The threaded stem 42 is of such length that it will extend beyond the opposite end of the head 35 when the shoulder 43 is in engagement with the end face of the head 35 and said stem receives a securing nut 44 provided with an inwardly extending reduced shank portion 45. This shank portion 45 is of a diameter to fit snugly in the bore 36 of the head 35 and is provided with a circumferentially extending groove 46 to receive the inner end of a fastener screw 47. The screw 47 is carried by the head 35, and it will be readily seen that, when the screw 47 has its inner end disposed in this groove 46, the nut 44 may be rotated to move the arm 40 longitudinally through the bore and permit removal of the handle without the securing nut being disconnected from the head 35. A securing pin 48 is securely fitted in a socket 49 formed radially in the arm 40 at the junction of the outer end portion of this arm and the reduced intermediate portion 41 thereof. When the nut 44 is unscrewed a sufficient distance to move the arm longitudinally and carry the pin out of position for contact with the end of the sleeve 35, the lever may be swung to rotate the reduced portion 41 of the arm 40 in the head 35 and bring the pin into position to enter either of the half round notches 50 formed in the head 35 and spaced from each other circumferentially of the bore 36. The nut will then be again tightened to draw the pin into the desired notch. The lever can, therefore, be caused to extend at a desired angle and will be held at the desired angle when the pin is seated in one of the notches. While only two notches 50 have been shown, it will be obvious that additional notches could be provided.

When the nut cracker is in use, the body portion will be tightly clamped to a table, as shown in Fig. 1, and the spring 31 will normally retain the plunger in the position shown in this figure with the jaws in spaced relation. The nut to be cracked will be placed between the jaws and the end portions of the nut will fit into the pockets 26 with the extreme end portions of the nut in contacting engagement with the cutting edges of the ribs 27. The lever is gripped by the enlarged end portion 38 and swung downwardly towards the dotted line position and as the lever is swung downwardly the arm 33 will be swung upwardly and forwardly towards the casing 21. As the arm 33 swings upwardly and forwardly, the plunger will be forced forwardly against the action of the spring 31 and the jaw carried by this plunger moved towards the other jaw carried by the head 18. This will apply pressure which will first cause the sharpened edges of the ribs 27 to cut through the shell at the ends of the nut and as the pressure increases the body portion of the nut will then be cracked. It will, therefore, be seen that with this nut cracker the nut will first have its end portions broken away from the body portion of the shell and the body portion of the shell then cracked by a strain which will be exerted longitudinally of the nut. The nut will be prevented from turning end over end when the pressure is applied as its end portions fit into the cups and this will prevent the turning movement. Therefore, the shell of the nut will be cracked in a very efficient manner and after being cracked the pieces can be removed from the meat without the meat being broken into small parts. After the nut has been cracked, the pressure upon the lever will be relieved and the spring 31 will expand to return the plunger to its normal position and swing the lever upwardly to the original position. The nut which has been cracked will be released as soon as the jaws have moved far enough apart from each other and a new one may then be put in place and the operation repeated. If it is found more convenient to have the nut cracker secured to a portion of a table or other support with the body portion 10 disposed vertically, the nut cracker may be mounted in this position and if desired the nut 44 adjusted so that the lever may be set at any angle which would be most convenient to the person using the nut cracker.

Having thus described the invention, I claim:

1. A nut cracker comprising a body adapted to be connected with a support, a jaw carried by said body, a sleeve carried by said body rearwardly of said jaw, a plunger sliding in said sleeve for movement towards and away from said jaw and extending through the rear end of the sleeve, a jaw carried by said plunger, means yieldably holding said plunger against movement towards the first mentioned jaw, an arm pivotally carried by said body and adapted to engage the rear end of said plunger, and a lever handle carried by said arm and extending forwardly therefrom at one side of said sleeve and first mentioned jaw and adapted to be swung downwardly and move said arm forwardly to force said plunger forwardly towards the first mentioned jaw and cause cracking of a nut between the jaws.

2. A nut cracker comprising a body adapted to be connected with a support, a jaw carried by the forward portion of said body, a sleeve carried by the rear portion of said body in spaced relation to said jaw and in axial alinement therewith, a plunger sliding in said sleeve, a jaw at the forward end of said plunger, said sleeve having an inwardly extending annular flange at its forward end and said plunger having an outstanding annular collar, a spring in said sleeve about said plunger and engaging said flange and collar to yieldably hold the plunger against movement towards the first-mentioned jaw, an arm pivotally connected with the rear portion of said body for engagement with the rear end of said plunger, and an operating lever carried by said arm and extending forwardly therefrom and adapted to be swung downwardly to move said arm forwardly and move the plunger towards the first-mentioned jaw.

3. A nut cracker comprising a body, a jaw carried by said body, a sleeve carried by said body in spaced axial alinement with said jaw, a plunger sliding in said sleeve, a jaw carried by one end of said plunger, a spring yieldably holding said plunger against movement towards the first-mentioned jaw, a bearing carried by said body adjacent said sleeve, an arm pivoted to said bearing, and a handle adjustably carried by said arm and when moved in one direction adapted to swing said arm towards said sleeve and apply pressure to the outer end of said plunger for causing movement of the plunger towards the first-mentioned jaw.

4. A nut cracker comprising a body, a jaw carried by said body, a sleeve carried by said body in spaced axial alinement with said jaw, a plunger sliding in said sleeve, a jaw carried by one end of said plunger, a spring yieldably holding said plunger against movement towards the first-mentioned jaw, a bearing carried by said body adjacent said sleeve, an arm pivoted to said bearing for engagement with the outer end of said plunger and when moved towards said sleeve adapted to force said plunger towards the first-mentioned jaw, an operating handle pivotally connected with said arm, and means for releasably securing said handle in a predetermined angular relation to said arm.

5. A nut cracker comprising a body, a jaw carried by said body, a sleeve carried by said body in spaced axial alinement with said jaw, a plunger sliding in said sleeve, a jaw carried by one end of said plunger, a spring yieldably holding said plunger against movement towards the first-mentioned jaw, a bearing carried by said body adjacent said sleeve, an arm pivoted to said bearing for engagement with the outer end of said plunger and when moved towards said sleeve adapted to force said plunger towards the first-mentioned jaw, a head at the outer end of said arm and having a bore transversely of the arm, a lever handle, a side arm extending from said lever handle and rotatably fitting in the bore of said head to pivotally mount the handle, and means for releasably securing said handle in a predetermined angular relation to said arm.

6. A nut cracker comprising a body, a jaw carried by said body, a sleeve carried by said body in spaced axial alinement with said jaw, a plunger sliding in said sleeve, a jaw carried by one end of said plunger, a spring yieldably holding said plunger against movement towards the first-mentioned jaw, a bearing carried by said body beneath said sleeve, an arm pivoted to said bearing for engagement with the outer end of said plunger and when moved towards said sleeve adapted to force said plunger towards the first-mentioned jaw, a head at the outer end of said arm and having a bore transversely of the arm, a lever handle, a side arm extending from said lever handle and having a reduced portion rotatably fitting in the bore of said head and providing an annular shoulder engaging said head at one end thereof, said side arm being provided with a radially disposed socket having a portion thereof extending across said shoulder and said head having recesses in the said end thereof to register with the socket of said side arm, and a locking pin adapted to fit in said socket and a selected recess to retain the handle in a predetermined angular relation to said arm.

7. A nut cracker comprising a body, a jaw carried by said body, a sleeve carried by said body in spaced axial alinement with said jaw, a plunger sliding in said sleeve, a jaw carried by one end of said plunger, a spring yieldably holding said plunger against movement towards the first-mentioned jaw, a bearing carried by said body beneath said sleeve, an arm pivoted to said bearing for engagement with the outer end of said plunger and when moved towards said sleeve adapted to force said plunger towards the first-mentioned jaw, a head at the outer end of said arm and having a bore transversely of the arm, a lever handle, a side arm extending from said lever handle and having its intermediate portion reduced and rotatably fitting in the bore of said head and its free end portion further reduced and threaded, a securing nut screwed upon the threaded end portion of said side arm and having a hub extension rotatably fitting in the bore of said head, a fastener screw carried by said head and extending into an annular groove in the hub portion of said nut, and a pin carried by said side arm and engaging said head to securely retain said lever handle in a predetermined angular relation to said arm.

In testimony whereof I affix my signature.

BROOKE S. RAMEY. [L. S.]